June 21, 1955 — R. S. ZEBARTH — 2,710,985
APPARATUS FOR SCALDING POULTRY
Filed May 14, 1951
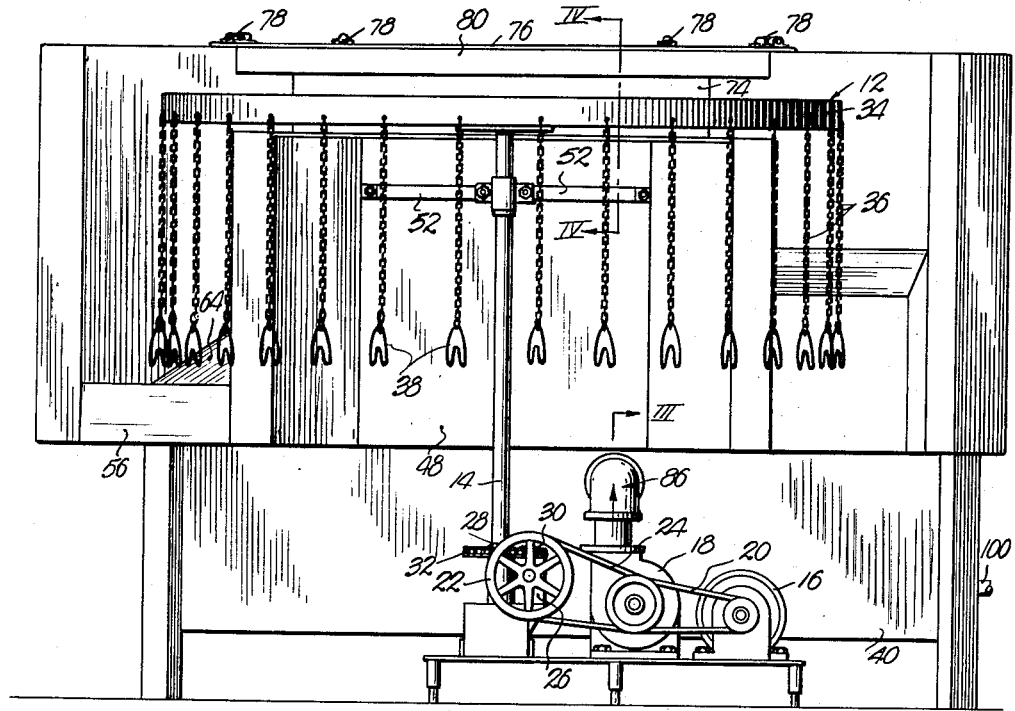
Fig. 1.
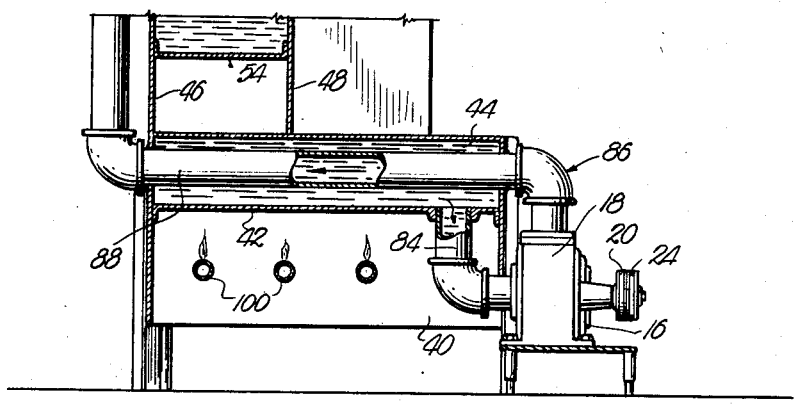
Fig. 3.
INVENTOR.
Ralph S. Zebarth
BY
ATTORNEY.

INVENTOR.
Ralph S. Zebarth
BY
ATTORNEY.

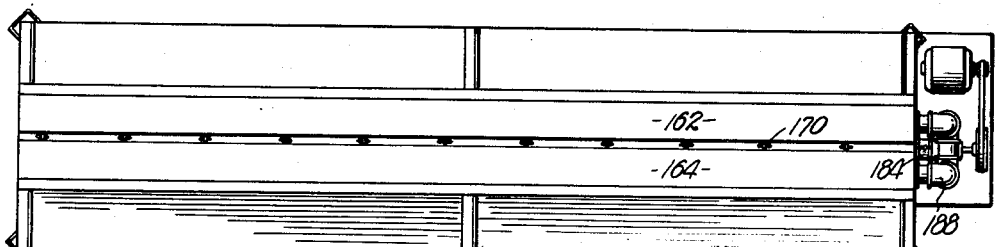
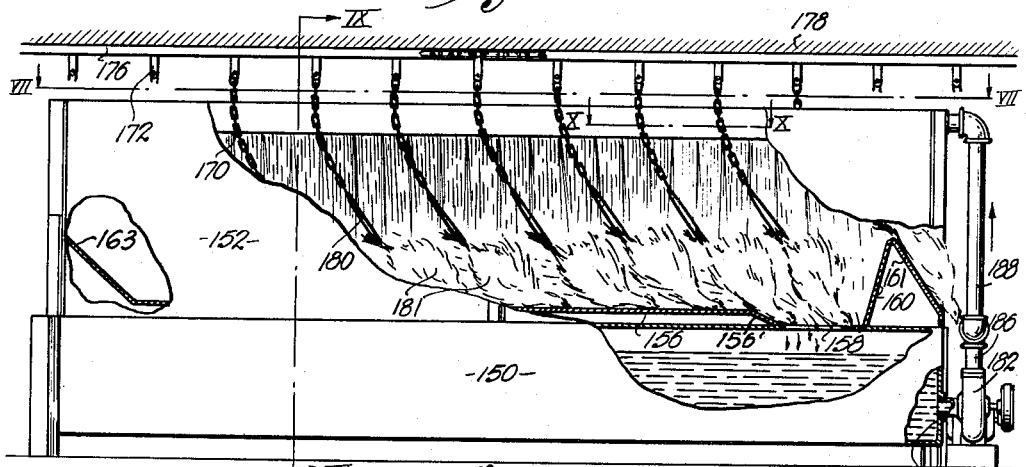
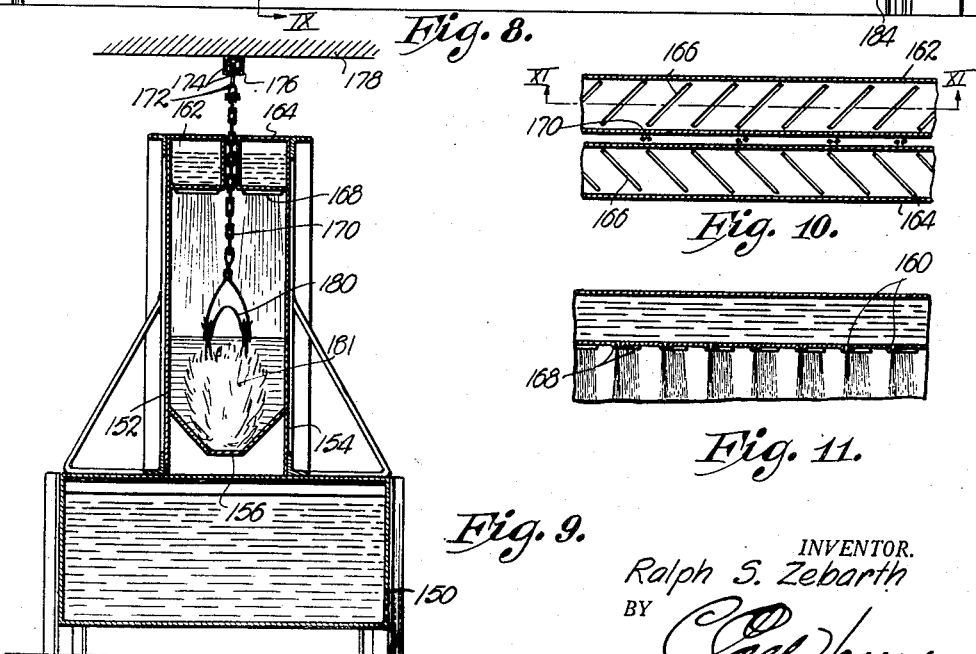

United States Patent Office 2,710,985
Patented June 21, 1955

2,710,985
APPARATUS FOR SCALDING POULTRY

Ralph S. Zebarth, Hickman Mills, Mo., assignor to Gordon Johnson Company, Kansas City, Mo., a corporation of Missouri Application May 14, 1951, Serial No. 226,225

6 Claims. (Cl. 17—11.2)

This invention relates to poultry dressing equipment and more particularly to apparatus for facilitating the scalding operation as a necessary step prior to plucking of the feathers, the primary object being to provide structure for directing a relatively heavy flow of hot water or other liquid against the fowl as the same is advanced through a predetermined path of travel.

Various means have heretofore been provided for scalding poultry automatically and on a relatively large scale including spray-heads and immersion tanks, but in the former instance the bird is not sufficiently scalded because of the free draining of the liquid therefrom and in the case of a scalding vat it is difficult to hold the bird in an immersed condition while advancing the same to a point of subsequent dressing steps.

Accordingly, it is the most important object of the present invention to combine in novel apparatus, means for forcing a heavy flow of liquid against the bird and to thereby hold the bird completely immersed within the hot liquid during at least a portion of its path of travel through the scalding structure.

Another important object of the present invention is to provide fowl dressing apparatus that includes structure presenting an open top channel adapted to receive the liquid for scalding the bird and through which the same is advanced, together with a liquid re-circulating system that not only holds the bird immersed in the liquid within the channel, but causes a counter flow of the liquid in a direction opposite to the direction of advancement of the bird through the channel.

Another object of this invention is to provide fowl dressing apparatus wherein the aforesaid channel is provided with a portion that presents a tank or sump for maintaining a body of liquid through which the bird is advanced and held immersed therein by the flow of re-circulating liquid.

A still further object of this invention is to provide re-circulating means that includes novel control elements for the liquid to direct the same transversely of the path of travel of the bird and throughout a substantial length of its travel, thereby assuring complete scalding in a single operation.

Other objects include the way in which the bird is suspended by flexible means to the end that the same is free to slide along the bottom of the channel and be dragged through the liquid therein; the manner of providing a weir within the channel to present the bird-receiving body of liquid aforesaid; and many other more minor objects including details of construction, all of which will be made clear or become apparent as the following specification progresses, reference being had to the accompanying drawings, wherein:

Figure 1 is a front elevational view of apparatus for scalding poultry made pursuant to one form of the present invention.

Fig. 3 is an enlarged, fragmentary, sectional view taken on line III—III of Fig. 1 looking in the direction of the arrows.

Fig. 7 is a cross-sectional view taken on line VII—VII of Fig. 8 and illustrating a modified form of apparatus for scalding poultry.

Fig. 8 is a side elevational view of the modification of Fig. 7, parts being broken away and in section to reveal details of construction.

Fig. 9 is a vertical, transverse, cross-sectional view taken on line IX—IX of Fig. 8.

Fig. 10 is a fragmentary, cross-sectional view taken on line X—X of Fig. 8; and

Fig. 11 is a cross-sectional view taken on line XI—XI of Fig. 10.

Figure 2:
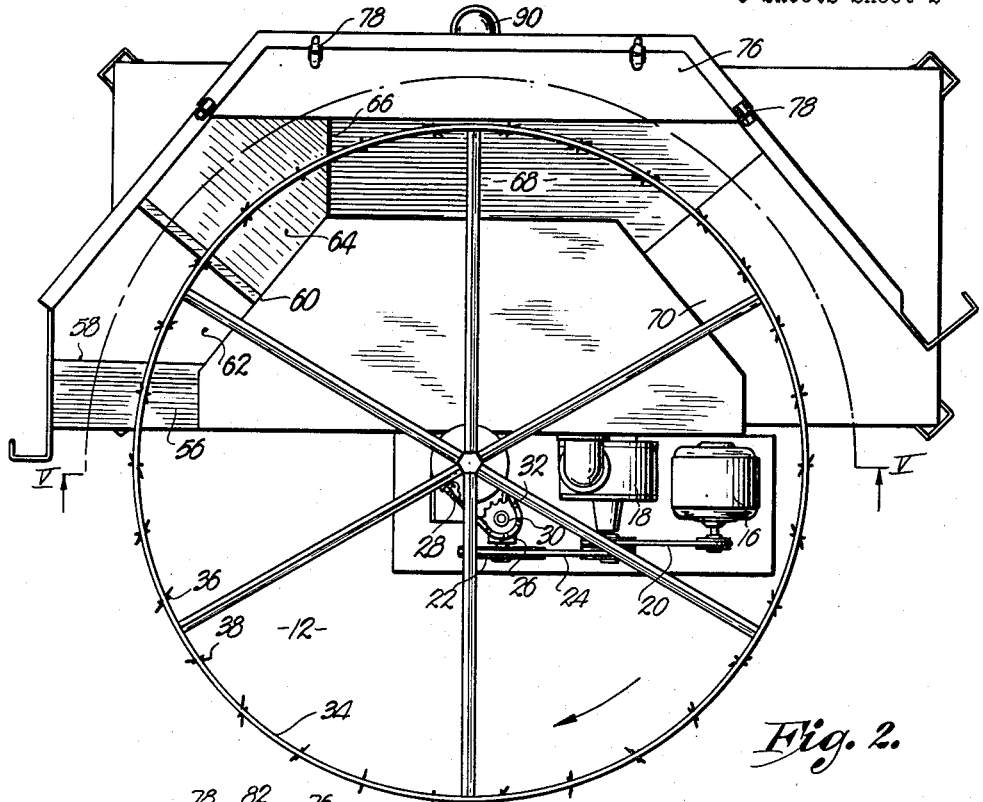
Fig. 2 is a top plan view thereof.

In the form of the present invention shown in Figs. 1 to 6 inclusive, there is provided fowl advancing means taking the form of a wheel 12 mounted for rotation on a vertical axis through the medium of a spindle 14 that is in turn rotated by an electric motor or other prime mover 16. Prime mover 16 also drives a liquid pump 18 through a chain or belt 20 which in turn drives a pulley 22 through a continuous chain or belt 24.

Pulley 22 is connected with a speed reducer 26 and sprocket wheels 28 and 30 on spindle 14 and on speed reducer 26 respectively, are interconnected by a continuous chain 32.

An annular rim 34 forming a part of the horizontal wheel 12 supports a plurality of depending, flexible elements such as chains 36, each provided with a shackle 38 on the lowermost end thereof. The particular nature of the shackles 38 forms no part of this invention and may be selected as desired to receive and support a bird to be advanced through the scalding apparatus about to be described. Such apparatus is disposed entirely on one side of the vertical spindle 14 and includes a hollow, inverted body 40, having a horizontal partition 42 presenting a relatively shallow rectangular tank 44.

Figure 4:
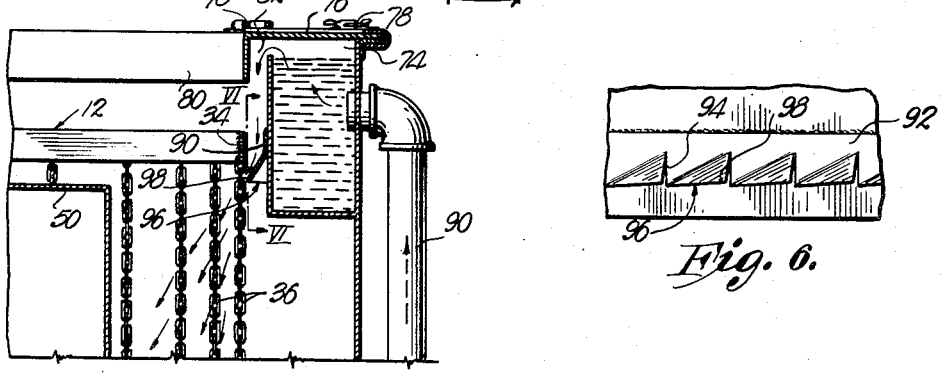
Fig. 4 is an enlarged, transverse, cross-sectional view taken on line IV—IV of Fig. 1.

A pair of spaced, substantially arcuate, upstanding walls 46 and 48 extending upwardly from the body 40, are in concentric relationship with the spindle 14, the wall 48 being provided with a substantially semi-circular top wall 50 underlying a portion of the wheel 12 as illustrated in Fig. 4 of the drawings. Braces 52 interconnect the wall 48 adjacent the top wall 50 thereof and the spindle 14 immediately below wheel 12. The wall 46 is slightly higher than the wall 50 and therefore, partially circumscribes the wheel 12 and during rotation of the latter, the chains 36, their shackles 38 and the birds carried thereby, pass through the space presented between walls 46 and 48.

The walls 46 and 48 cooperate with a bottom wall broadly designated by the numeral 54, secured therebetween in presenting a continuous channel for the birds being advanced between walls 46 and 48 upon rotation of wheel 12. The direction of rotation of wheel 12 is as indicated by the arrow in Fig. 2 of the drawings, and the birds being advanced thereby are first directed against an inclined portion or blood trap 56 forming a part of the bottom wall 54.

A vertical weir 58 depending from the uppermost edge of inclined portion 56 connects with a short, horizontal portion 60 having a liquid outlet 62.

A second inclined portion 64 forming a part of the wall 54 and having the same angle of inclination as the portion 56 is slightly longer than inclined portion 56 and extends upwardly from horizontal portion 60. A second weir 66 depends vertically from the upper end of inclined ramp portion 64 and joins with an elongated, horizontal portion 68 that in turn terminates in a third inclined portion 70.

It is seen therefore, that the portions 66, 68 and 70 of the bottom wall 54, presents a liquid-receiving open top vat or pan broadly designated by the numeral 72.

Figure 5:
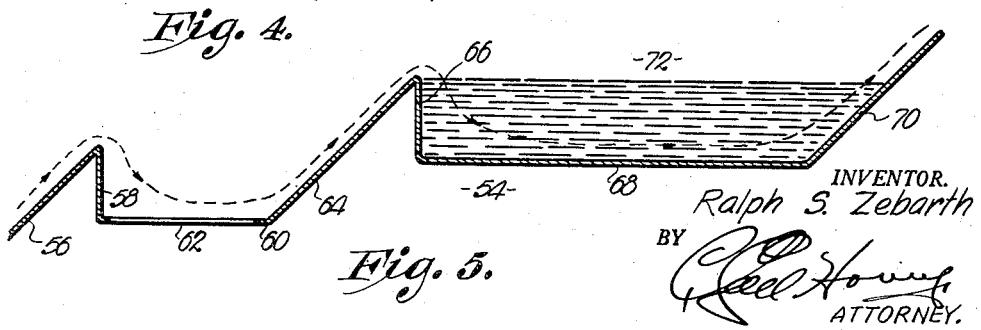
Fig. 5 is a schematic view taken on line V—V of Fig. 2 showing the various levels of the fowl-traversing channel forming a part of the apparatus.

Since the showing of the bottom wall 54 is schematic in Fig. 5, it must be realized that the same is actually substantially arcuate and that the inclined portions 56 and 70 are diametrically opposed and that the upper end of inclined portion 70 defines the outlet end of the open top channel through which the bird is advanced by the wheel 12 as it rotates in the direction of the arrow in Fig. 2.

An elongated, rectangular tank 74 at the uppermost end of the rear wall 46 and on the inner face thereof, is provided with a cover 76 releasably mounted through the medium of a plurality of fastening elements 78. The lid 76 is provided with a down-turned flange 80 that is spaced slightly away from the proximal wall of the tank 74 and such wall is provided with an elongated outlet opening 82 adjacent the upper end thereof.

The pump 18 has an inlet tube 84 that joins with the partition 42 and therefore, communicates with the tank 44 and an outlet conduit 86 having a horizontal portion 88 that extends through the tank 44 and a vertical portion 90 that extends upwardly exteriorly of the wall 46 and empties into the tank 74.

Figure 6:
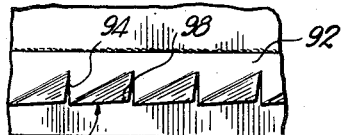
Fig. 6 is an enlarged fragmentary, elevational view taken on line VI—VI of Fig. 4.

Liquid deflection means is provided on that wall of tank 74 having an opening 82 therein that includes an elongated strip 92 extending substantially the entire length of the tank 74 exteriorly thereof and secured directly thereto. Strip 92 is slit transversely as at 94 presenting a number of wings 96, each having one lowermost corner 98 thereof bent outwardly as is shown in Figs. 4 and 6 of the drawings.

The liquid within the tank 44 is maintained in a heated condition by suitable heating elements 100 disposed within the body 40 in underlying relationship to the partition 42 thereof.

The apparatus shown in Figs. 1 to 6 inclusive, is placed in operation by energizing the motor 16 to drive pump 18 and to rotate the spindle 14 and thus the wheel 12 thereon. Liquid is moved by the pump 18 from the tank 44 by way of tube 84 and into the tank 74 by means of conduit 86. The capacity of pump 18 and thus the lines 84 and 86, is relatively great, to the end that the tank 74 is maintained substantially full at all times and so that a relatively large volume of water will flow through the outlet 82 of tank 74 and gravitate toward the deflector strip 92.

The down-turned flange 80 of lid 76, serves to guide the liquid downwardly and as soon as the same strikes the strip 92, it will be directed substantially as shown by the arrows in Fig. 4 of the drawings. A portion of each wing 96 serves to channel the liquid downwardly, whereas the out-turned corners 98 thereof operate to direct the liquid at an angle toward the wall 48. All of such liquid emanating from the tank 74 falls upon the bottom wall 54, filling the vat 72 thereof and the continuous flow of the liquid is in a direction from the inclined portion 70 toward the weir 58. The liquid will overflow from the vat 72, over the weir 66, down inclined portion 64, through the outlet 62 and thence into the tank 44 for re-circulation by pump 18 through tube 84.

Simultaneously, with such re-circulation of the liquid, the wheel 12 operates to advance the birds through the channel defined by walls 46, 48 and 54, which birds are suspended on the flexible chains 36 by shackles 38. It is seen that the direction of travel of the birds is counter to the direction of gravitational flow of the liquid along the wall 54 and by virtue of the flexibility of the chains 36, the bird is permitted to drag along the inclined portions 56 and 64 and until the same drops into the body of liquid of vat 72.

The tremendous force of the hot, scalding liquid emanating from the tank 74 and being directed against the birds as shown by the arrows in Fig. 4 of the drawings, will cause the bird to lie on the wall 68 of vat 72 and such force will also maintain the bird completely immersed within the liquid of vat 72 as the same is dragged to a point where it slides upwardly along inclined portion 70.

It is seen that substantially the entire length of bottom wall 54 is higher than the birds suspended from shackles 38 and that therefore, the birds are maintained in contact with wall 54 throughout the time the same are advanced between walls 46 and 48. Rather than being suspended from the wheel 12 so that the liquid will readily and quickly drain from the bird, it is completely immersed virtually from the time it strikes the inclined portion 64 until it moves to a point adjacent the uppermost end of the inclined portion 70. The counter flow of the liquid enhances the scrubbing action and cooperates with the movement of the bird in the opposite direction in assuring complete scalding before the birds are removed from the shackles 38 for subsequent dressing steps.

The principles above set forth are also followed in the form of the present invention shown in Figs. 7 to 11 inclusive, though the shape and contour of the apparatus thereof differs slightly. In this case, there is provided an elongated, horizontal tank broadly designated by the numeral 150, and a pair of upstanding, spaced, vertical walls 152 and 154 are carried by the tank 150. The walls 152 and 154 are substantially coextensive in length with the tank 150 and are joined by a bottom wall or partition 156 that is substantially V-shaped in cross-section in the manner illustrated in Fig. 9 of the drawings.

Tank 150 has an inlet opening 158 in the uppermost wall thereof and adjacent one of its ends, bottom wall 156 terminating at one end thereof in an inclined ramp 156′ which registers with the opening 158. An inclined weir 160 extending upwardly from the outlet opening 158 opposite and spaced from the inclined ramp portion 156′ interconnects the upstanding walls 152 and 154 and an oppositely inclined blood trap 161 connects with weir 160. An inclined portion 163 on the opposite end of wall 156 corresponds to the portion 70 in Fig. 1.

A pair of identical, elongated, spaced-apart tanks 162 and 164 carried by walls 152 and 154 respectively on their innermost faces and adjacent the uppermost ends thereof, are each provided with inclined outlet slots 166 in the bottom wall thereof.

It is seen in Fig. 10 of the drawings that slots 166 of tank 162, converge with the slots 166 of tank 164 as the proximal walls of tanks 162 and 164 are approached. Slots 166 are stamped from the bottom walls of the tanks 162 and 164 presenting opposed down-turned flanges 168 for each slot 166 respectively.

The space between the tanks 162 and 164 clears a plurality of chains or other flexible elements 170, that depend from brackets 172 of a continuous conveyor, the brackets 172 each having a pair of opposed rollers 174 that are guided along a rectilinear path of travel by an elongated track 176 mounted on any suitable structure 178 overlying the tanks 162 and 164. Each chain 172 respectively is provided with a shackle 180 for birds 181.

Liquid re-circulating means includes a liquid pump 182 at that end of the tank 150 adjacent inlet 158 and connected at its inlet end with the tank 150 by a tube 184. An outlet conduit 186 extending upwardly from the pump 182 is provided with branches 188 for each tank 162 and 164 respectively.

Birds 181 to be scalded are mounted on the shackles 180 and caused to be advanced between the walls 152 and 154 along track 176 until the same move over the weir 160 to a point where the breasts thereof slide along the wall 156. Here again the direction of flow of the liquid along the wall 156 toward the outlet 158 is counter to the direction of advancement of the birds 181 being scalded. Pump 182 recirculates the liquid from 150 into the tanks 162 and 164 and toward that end of the latter opposite to pump 182, weir 160 and outlet 158. Again, the capacity of pump 182 is preferably great to the end that a tremendous amount of liquid emanates from the tanks 162 and 164, through the slots 166. By virtue of the inclination of the slots 166, the birds 181 are completely immersed by the liquid and the force thereof tends to hold the birds against the bottom wall 156 where the same are immersed in the large volume of downwardly flowing liquid flowing along wall 156 toward the outlet 158.

Birds 181 are preferably maintained in the slightly inclined position shown in Fig. 8 with their backs up where the liquid can reach all the feathers. The tail and wings of the birds 181 no longer become a protective shield for a substantial amount of feathers as in conventional scalders.

It is now seen that the principles of the present invention can be carried out through use of either of the devices above described and through use of many modified forms thereof, and such changes as fairly come within the spirit of the invention are, therefore, contemplated hereby.

Having thus described the invention what is claimed as new and desired to be secured by Letters Patent is:

1. In an apparatus of the class described, an open top scalder comprising a trough-like member provided with inlet and outlet ends, said trough-like member having a bottom including an inclined ramp, water-delivery means adjacent the upper end of said ramp, liquid discharge means adjacent the lower end of said ramp, and a conveyor extending longitudinally of said inclined ramp and moving thereover for dragging poultry up said inclined ramp against the flow of water downwardly over said ramp.

2. In an apparatus as set forth in claim 1 wherein said water-delivery means adjacent the upper end of said inclined ramp includes a water vat having an outlet end coextensive with and connected to the upper end of said inclined ramp.

3. In an apparatus as set forth in claim 1 wherein the bottom of said trough-like member is provided with a wall member adjacent the trough inlet end and a wall member adjacent the trough outlet end, each of said wall members being positioned transversely of the longitudinal axis of said bottom and extending upwardly therefrom for preventing the flow of water from the inlet and outlet ends of said trough-like member.

4. In an apparatus as set forth in claim 1 wherein the longitudinal axis of the bottom of said trough-like member and the inclined ramp portion thereof is arcuate and said conveyor means is mounted for movement along an arcuate path parallel to the arcuate longitudinal axis of said bottom.

5. In an apparatus as set forth in claim 1 wherein water conduit means are mounted above the bottom of said trough-like member longitudinally of said inclined ramp, said water conduit being provided with spray means for directing a water spray downwardly toward said bottom and said inclined ramp portion thereof.

6. In an apparatus as set forth in claim 5 wherein spray deflector means are mounted on said apparatus above the bottom of said trough-like member and below spray means for distributing said spray uniformly over said bottom and said inclined ramp portion thereof.

References Cited in the file of this patent

UNITED STATES PATENTS

| 1,672,555 | Barker et al. | June 5, 1928 |
| 1,770,565 | Anderson | July 15, 1930 |
| 2,001,813 | Bouda | May 21, 1935 |
| 2,549,070 | Drews | Apr. 17, 1951 |
| 2,602,186 | Johnson | July 8, 1952 |
| 2,649,615 | Sharp | Aug. 25, 1953 |

FOREIGN PATENTS

| 112,931 | Australia | Apr. 16, 1941 |